United States Patent [19]

Enokihara et al.

[11] Patent Number: 5,530,777
[45] Date of Patent: Jun. 25, 1996

[54] OPTICAL MODULATION DEVICE

[75] Inventors: Akira Enokihara, Nara; Kentaro Setsune, Osaka; Morikazu Sagawa, Tokyo; Mitsuo Makimoto, Yokohama, all of Japan

[73] Assignee: Matsushita Industrial Electric Co., Ltd., Osaka, Japan

[21] Appl. No.: 372,326

[22] Filed: Jan. 13, 1995

Related U.S. Application Data

[63] Continuation-in-part of Ser. No. 106,649, Aug. 16, 1993, Pat. No. 5,400,416.

[30] Foreign Application Priority Data

Sep. 28, 1992 [JP] Japan .................... 4-258186

[51] Int. Cl.[6] ............................................. G02F 1/035
[52] U.S. Cl. ............................................................ 385/2
[58] Field of Search ........................................... 385/2–9

[56] References Cited

U.S. PATENT DOCUMENTS

| 4,372,643 | 2/1983 | Liu et al. | 385/2 X |
| 5,400,416 | 3/1995 | Enokihara et al. | 385/2 |

OTHER PUBLICATIONS

"Transactions of the institute of Electronics, infor. & Comm. Engr of Japan", vol. 371–C, No. 5, May 1988, Tokyo. JP pp. (635–658) by Izutsu et al.

"Transactions of the Insititute of Electronics, infor. & Comm. Engr. of Japan", vol. E–71, No. 4, Apr. 1988, Tokyo JP pp. (342–344) by Isutsu et al.

Primary Examiner—Akm E. Ullah
Attorney, Agent, or Firm—Rossi & Associates

[57] ABSTRACT

An optical modulation device includes a substrate, and a dielectric member having first and second surfaces opposite to each other. An optical waveguide extends on the first surface of the dielectric member and exhibits an electro-optical effect. First and second parallel lines are electromagnetically coupled with each other, and are of a microstrip line structure. The first line has a first line member and a ground plane, and the second line has a second line member and the ground plane. The first line member and the second line member extend on the first surface of the dielectric member and extend at opposite sides of the optical waveguide respectively. The ground plane extends between the substrate and the second surface of the dielectric member.

7 Claims, 9 Drawing Sheets

OPTICAL MODULATION DEVICE

CROSS-REFERENCES TO RELATED APPLICATIONS

This is a continuation-in-part of U.S. patent application Ser. No. 08/106,649, filed on Aug. 16, 1993, now U.S. Pat. No. 5,400,416.

BACKGROUND OF THE INVENTION

1. Field of the Invention

This invention relates to an optical modulation device. This invention also relates to an optical switch device.

2. Description of the Prior Art

Semiconductor lasers are widely used as light sources in optical communication systems. A typical way of modulating an optical signal is to control the injection current of a semiconductor laser in response to a modulating signal. However, it is generally difficult to operate a semiconductor laser at higher than several GHz frequencies by such direct modulation.

External electro-optic waveguide modulators using dielectric crystals can perform higher-frequency modulation. A typical electro-optic waveguide modulator includes a transmission line and an optical waveguide. The transmission line serves as a modulating electrode which enables a modulating signal to propagate on an electro-optical crystal. The optical waveguide extends near the transmission line. An electric field is induced around the modulating electrode in response to the modulating signal. The electro-optical effect causes the refractive indices of the optical waveguide to vary with the induced electric field. Accordingly, the phase of a light wave in the optical waveguide is varied in response to the modulating signal so that optical modulation is realized.

General electro-optical crystals such as an LiNbO$_3$ crystal do not have large electro-optical coefficients. Thus, in an electro-optical modulator, it is important to effectively apply a modulating electric field to an optical waveguide to attain a good modulation efficiency.

SUMMARY OF THE INVENTION

It is an object of this invention to provide an improved optical modulation device.

It is another object of this invention to provide an improved optical switch device.

A first aspect of this invention provides an optical modulation device comprising a substrate; a dielectric member having first and second surfaces opposite to each other; an optical waveguide extending on the first surface of the dielectric member and exhibiting an electro-optical effect; first and second parallel lines electromagnetically coupled with each other and being of a microstrip line structure; wherein the first line comprises a first line member and a ground plane, and the second line comprises a second line member and the ground plane, wherein the first line member and the second line member extend on the first surface of the dielectric member and extend at opposite sides of the optical waveguide respectively, and wherein the ground plane extends between the substrate and the second surface of the dielectric member.

A second aspect of this invention provides an optical modulation device comprising a substrate; a first dielectric member having first and second surfaces opposite to each other; a second dielectric member having first and second surfaces opposite to each other; an optical waveguide extending between the first surface of the first dielectric member and the second surface of the second dielectric member and exhibiting an electro-optical effect; first and second parallel lines electromagnetically coupled with each other and being of a strip line structure: wherein the first line comprises a first line member and first and second ground planes, and the second line comprises a second line member and the first and second ground planes, wherein the first line member and the second line member extend between the first surface of the first dielectric member and the second surface of the second dielectric member and extend at opposite sides of the optical waveguide respectively, wherein the first ground plane extends between the substrate and the second surface of the first dielectric member, and wherein the second ground plane is located on the first surface of the second dielectric member.

A third aspect of this invention provides an optical modulation device comprising a substrate having first and second surfaces opposite to each other; an optical waveguide extending on the first surface of the substrate and exhibiting an electro-optical effect, the optical waveguide dividing into first and second branches at a first point, the first and second branches extending on the first surface of the substrate and meeting at a second point different from the first point; first and second parallel lines electromagnetically coupled with each other and being of a microstrip line structure; wherein the first line comprises a first line member and a ground plane, and the second line comprises a second line member and the ground plane, wherein the first line member and the second line member extend on the first surface of the substrate, wherein the first branch extends near and along an edge of the first line member which faces the second line member, wherein the second branch extends near and along an edge of the second line member which faces the first line member, and wherein the ground plane is located on the second surface of the substrate.

A fourth aspect of this invention provides an optical switch device comprising a substrate having first and second surfaces opposite to each other; an optical waveguide extending on the first surface of the substrate and exhibiting an electro-optical effect, the optical waveguide dividing into first and second branches at a division point, the first and second branches extending on the first surface of the substrate; first and second parallel lines electromagnetically coupled with each other and being of a microstrip line structure; wherein the first line comprises a first line member and a ground plane, and the second line comprises a second line member and the ground plane, wherein the first line member and the second line member extend on the first surface of the substrate, wherein the division point is located in a region between the first line member and the second line member, and wherein the ground plane is located on the second surface of the substrate.

It is preferable that opposing edges of the first and second line members incline with respect to each other, and the first branch extends near and along the inclining edge of the first line member, and that the second branch extends near and along the inclining edge of the second line member.

A fifth aspect of this invention provides an optical switch device comprising a substrate having first and second surfaces opposite to each other; a first optical waveguide extending on the first surface of the substrate and exhibiting an electro-optical effect; a second optical waveguide extending on the first surface of the substrate and exhibiting an electro-optical effect, wherein the first and second optical waveguides are optically coupled with each other; and first and second parallel lines electromagnetically coupled with each other and being of a microstrip line structure; wherein the first line comprises a first line member and a ground plane, and the second line comprises a second line member and the ground plane, wherein the first line member and the second line member extend on the first surface of the substrate, wherein the first optical waveguide extends near and along an edge of the first line member which faces the second line member, wherein the second optical waveguide extends near and along an edge of the second line member which faces the first line member, and wherein the ground plane is located on the second surface of the substrate.

A sixth aspect of this invention provides an optical modulation device comprising a substrate having first and second surfaces opposite to each other; an optical waveguide extending on the first surface of the substrate and exhibiting an electro-optical effect, the optical waveguide dividing into first and second branches at a first point, the first and second branches extending on the first surface of the substrate and meeting at a second point different from the first point; first and second parallel lines electromagnetically coupled with each other and being of a microstrip line structure; wherein the first line comprises a first line member and a ground plane, and the second line comprises a second line member and the ground plane, wherein the first line member and the second line member extend on the first surface of the substrate, wherein the first branch extends through a region between the first line member and the second line member, wherein the second branch extends at a side of the second line member which is remote from the first line member, wherein the second line member is located between the first branch and the second branch, and wherein the ground plane is located on the second surface of the substrate.

DESCRIPTION OF THE BACKGROUND ART

Background-art optical modulation devices will be described hereinafter for a better understanding of this invention.

Figure 1:
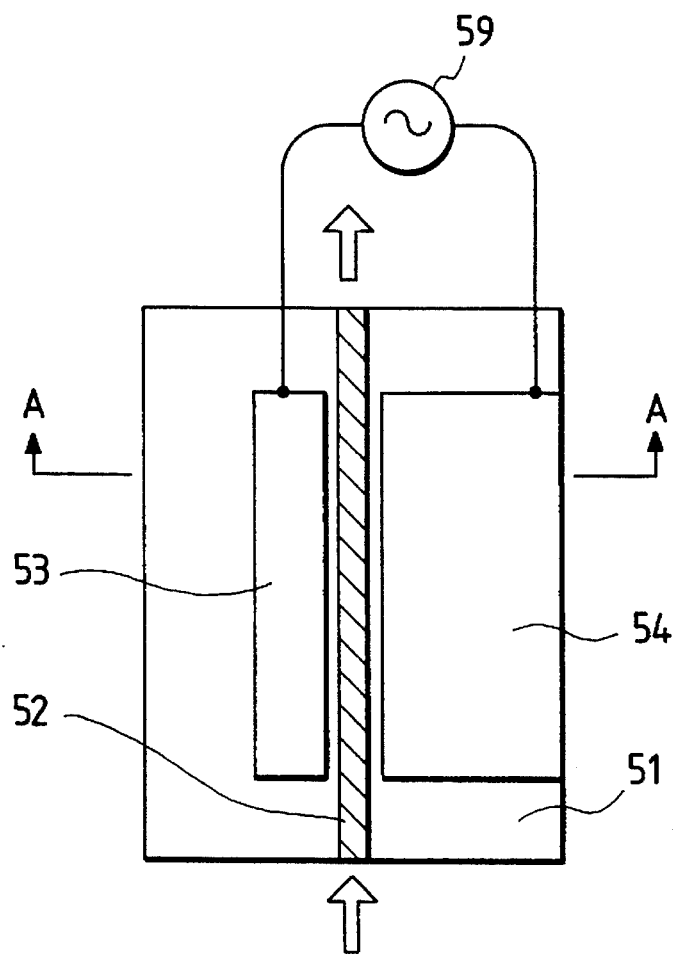
FIG. 1 is a plan view of a background-art optical modulation device.
Figure 2:
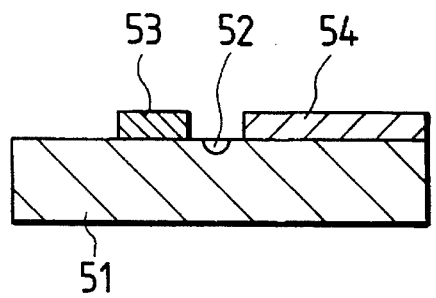
FIG. 2 is a sectional view taken along the line A—A of FIG. 1.

With reference to FIGS. 1 and 2, a first background-art optical modulation device includes a substrate 51 exhibiting an electro-optical effect. An optical waveguide 52 is formed in an upper surface of the substrate 51. The optical waveguide 52 also exhibits an electro-optical effect. The optical waveguide 52 extends along a centerline of the upper surface of the substrate 51. A light wave propagates along the optical waveguide 52.

Modulating electrodes including a strip electrode 53 and a ground electrode 54 are formed on the upper surface of the substrate 51. The strip electrode 53 and the ground electrode 54 are made of metal films such as aluminum films. The strip electrode 53 and the ground electrode 54 extend at opposite sides of the optical waveguide 52 respectively. The strip electrode 53 and the ground electrode 54 form a portion of a transmission line along which a modulating wave propagates.

A signal source for generating a modulating signal is electrically connected between the strip electrode 53 and the ground electrode 54. Thus, the modulating signal is applied between the strip electrode 53 and the ground electrode 54. A modulating wave corresponding to the modulating signal propagates in the strip electrode 53 so that an electric field depending on the modulating wave is developed between the strip electrode 53 and the ground electrode 54. As a result, the optical waveguide 52 is subjected to the electric field which depends on the modulating signal. The electro-optical effect causes the refractive indices of the optical waveguide 52 to vary with the electric field. Accordingly, the phase of the light wave in the optical waveguide 52 is varied in response to the modulating signal so that optical modulation is realized.

Since the potential at the ground electrode 54 remains zero, the potential difference between the strip electrode 53 and the ground electrode 54 is limited to a level corresponding to the potential at the strip electrode 53. In the case where the strip electrode 53 has a normal structure of a microstrip line, a ground plane provided on a lower surface of the substrate 51 also serves as a ground electrode so that the intensity of the electric field developed around the strip electrode 53 tends to be very small. To compensate for this tendency and thereby attain an adequately-strong electric field, the strip electrode 53 and the ground electrode 54 are of a coplanar line structure which enables a small distance therebetween.

In general, the coplanar line structure causes a relatively large loss of propagation of the modulating wave which results in a reduced modulation efficiency. The relation of the width of the strip electrode 53 with the distance between the strip electrode 53 and the ground electrode 54 determines the characteristic impedance of the transmission line. Thus, as the distance between the strip electrode 53 and the ground electrode 54 decreases, the width of the strip electrode 53 is generally required to also decrease to hold the characteristic impedance of the transmission line in a practically usable range (for example, in the range of around 50Ω). The decreased width of the strip electrode 53 causes a greater loss of the transmission line.

A second background-art optical modulation device is similar to the first background-art optical modulation device except for design changes indicated hereinafter. In the second background-art optical modulation device, a strip electrode 53 is suitably terminated at opposite ends thereof to form a line resonator. An available modulation efficiency increases as the Q (quality) factor of the line resonator increases. To provide a good line resonator, the length of the strip electrode 53 is set equal to about a half of the wavelength of a modulating signal. Thus, in the second background-art optical modulation device, the strip electrode 53 tends to be relatively long. In the case where the frequency of a modulation signal is so high that the time spent by light to pass through a side of the strip electrode 53 can not be ignored as compared with one period of the modulating signal, an available modulation efficiency abruptly drops as the length of the strip electrode 53 increases above a given length.

DESCRIPTION OF THE FIRST PREFERRED EMBODIMENT

Figure 3:
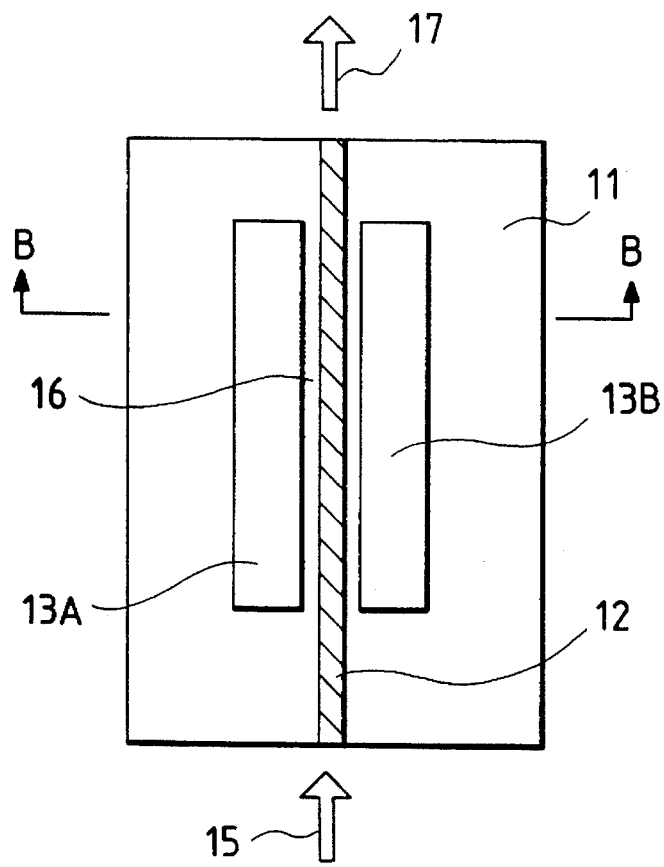
FIG. 3 is a plan view of an optical modulation device according to a first embodiment of this invention.
Figure 4:
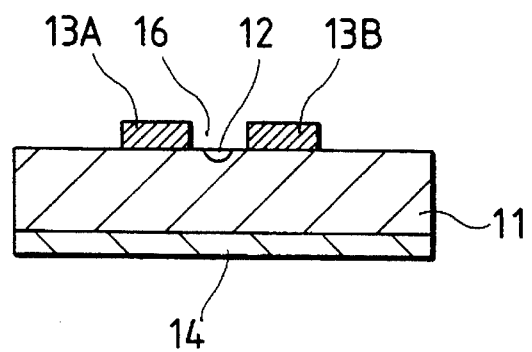
FIG. 4 is a sectional view taken along the line B—B of FIG. 3.

With reference to FIGS. 3 and 4, an optical modulation device (optical modulation element) includes a substrate 11 exhibiting an electro-optical effect. The substrate 11 has a shape of a rectangular or square flat plate. The substrate 11 is made of, for example, a single crystal of $LiNbO_3$ (lithium niobate).

An optical waveguide 12 is formed in an upper surface of the substrate 11 by a suitable process such as a Ti (titanium) thermal diffusion process. The optical waveguide 12 also exhibits an electro-optical effect. The optical waveguide 12 extends between opposite sides of the substrate 11 along a centerline of the upper surface thereof.

Parallel lines 13A and 13B electromagnetically coupled with each other are formed on the upper surface of the substrate 11 at opposite sides of the optical waveguide 12 respectively. The parallel lines 13A and 13B include thin metal films such as thin Al (aluminum) films or thin Au (gold) films made by suitable thin film forming processes such as a vacuum vapor deposition process, a process of photolithography, and a reactive ion etching process. The parallel lines 13A and 13B extend along or in parallel to the optical waveguide 12. The parallel lines 13A and 13B are spaced from each other by a predetermined gap 16 at which the optical waveguide 12 is exposed.

A ground plane 14 including a metal film is formed on a lower surface of the substrate 11 by a suitable process such as a vapor deposition process. Thus, the parallel lines 13A and 13B, the substrate 11, and the ground plane 14 compose a microstrip structure.

An input light beam 15 is applied to one end of the optical waveguide 12. The input light beam 15 enters the optical waveguide 12 via the end thereof and then travels along the optical waveguide 12, exiting from the other end of the optical waveguide 12 and forming an output light beam 17. While the input light beam 15 travels along the optical waveguide 12, it passes through a region adjoining the gap 16 between the parallel lines 13A and 13B. In the case where a modulating wave corresponding to a modulating signal is propagated along the parallel lines 13A and 13B by a suitable method, an electric field depending on the modulating signal is developed in and around the gap 16 and hence the refractive indices of the optical waveguide 12 are varied with the electric field due to the electro-optical effect. Specifically, the developed electric field has an amplitude which depends on the modulating signal. Therefore, the phase of the output light beam 17 is varied in accordance with the modulating signal. In this way, the input light beam 15 is phase-modulated with the modulating signal.

In general, guided waves propagating along parallel lines can be in one of even modes (symmetric modes) and odd modes (antisymmetric modes). When the guided waves assume an odd mode, potentials at corresponding points in the parallel lines have opposite signs so that a strong electric field is developed in a gap between the parallel lines. Accordingly, this embodiment is designed so that the modulating wave in an odd mode can be excited along the parallel lines 13A and 13B in response to the modulating signal. Thus, a strong electric field corresponding to the modulating signal can be developed in and around the gap 16 between the parallel lines 13A and 13B. The strong electric field enables a high optical modulation efficiency.

It should be noted that a Mach-Zehnder interferometer may be formed on the substrate 11 by using a branch optical waveguide. In this case, the input light beam 15 can be subjected to intensity modulation.

This embodiment may be modified as follows. In a first modification, the substrate 11 is made of material other than LiNbO3 (lithium niobate), and material exhibiting an electro-optical effect and having refractive indices higher than those of the substrate 11 is formed into a film-shaped optical waveguide on the substrate 11. In a second modification, the upper surface of the substrate 11 is formed with an optical-waveguide core portion having refractive indices higher than those of a surround, and an optical-waveguide cladding portion made of electro-optical material is formed on the core portion. In this case, optical modulation is executed by using an electric field of a light beam which extends out of the core portion.

DESCRIPTION OF THE SECOND PREFERRED EMBODIMENT

Figure 5:
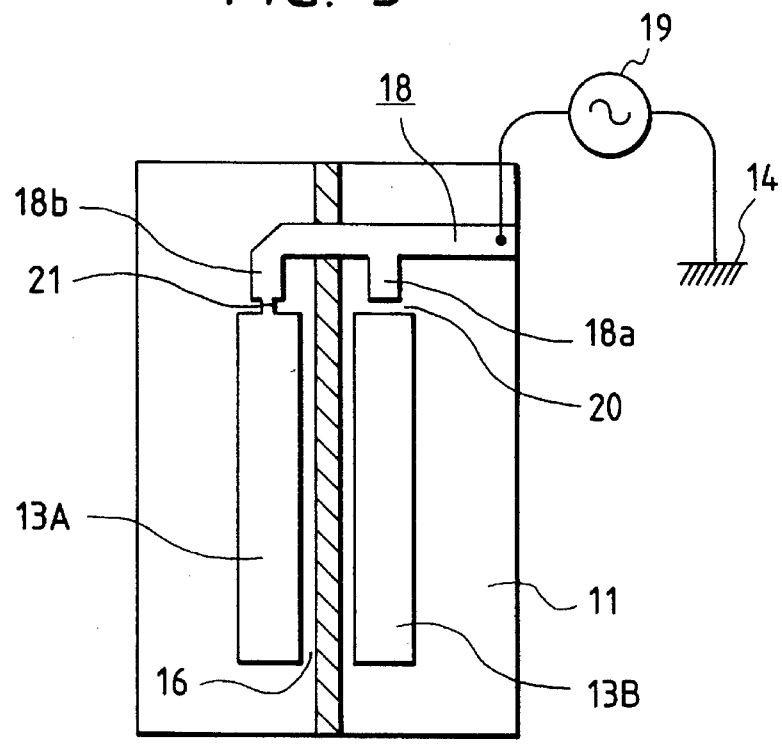
FIG. 5 is a diagram of an optical modulation device according to a second embodiment of this invention.

FIG. 5 shows a second embodiment of this invention which is similar to the embodiment of FIGS. 3 and 4 except for an additional arrangement indicated hereinafter.

As shown in FIG. 5, a signal input terminal 18 is formed on an upper surface of a substrate 11. A signal source 19 for generating a modulating signal is electrically connected between the input terminal 18 and a ground plane 14 formed on a lower surface of the substrate 11.

The input terminal 18 has two branches 18a and 18b. The branch 18a is spaced from an end of a line 13B by a predetermined gap 20 so that the branch 18a is capacitively coupled with the end of the line 13B. The branch 18b is connected to an end of a line 13A via a tap or bridge 21 so that the branch 18b is inductively coupled with the end of the line 13A. Therefore, the modulating signal generated by the signal source 19 is fed via the input terminal 18 to the parallel lines 13A and 13B in a manner such that potentials at corresponding points in the parallel lines 13A and 13B are out of phase by 180 degrees. Thus, a modulating wave in an odd mode is excited along the parallel lines 13A and 13B in response to the modulating signal, and a strong electric field corresponding to the modulating signal is developed in and around a gap 16 between the parallel lines 13A and 13B. The strong electric field enables a high optical modulation efficiency.

It should be noted that a Mach-Zehnder interferometer may be formed on the substrate 11 by using a branch optical waveguide. In this case, an input light beam can be subjected to intensity modulation.

This embodiment may be modified as follows. In a first modification, the substrate 11 is made of material other than LiNbO$_3$ (lithium niobate), and material exhibiting an electro-optical effect and having refractive indices higher than those of the substrate 11 is formed into a film-shaped optical waveguide on the substrate 11. In a second modification, the upper surface of the substrate 11 is formed with an optical-waveguide core portion having refractive indices higher than those of a surround, and an optical-waveguide cladding portion made of electro-optical material is formed on the core portion. In this case, optical modulation is executed by using an electric field of a light beam which extends out of the core portion. In a third modification, the branch 18a is coupled with the line 13B by a suitable capacitive element other than the gap 20 while the branch 18b is coupled with the line 13A by a suitable inductive element other than the tap 21. In a fourth modification, the input terminal 18 is formed with a stub to compensate for reflection of the modulating signal which might occur at the gap 20 and the tap 21. In a fifth modification, ends of the parallel lines 13A and 13B remote from the input terminal 18 are terminated via a resistor or resistors having resistances corresponding to the characteristic impedance of the parallel lines 13A and 13B.

DESCRIPTION OF THE THIRD PREFERRED EMBODIMENT

Figure 6:
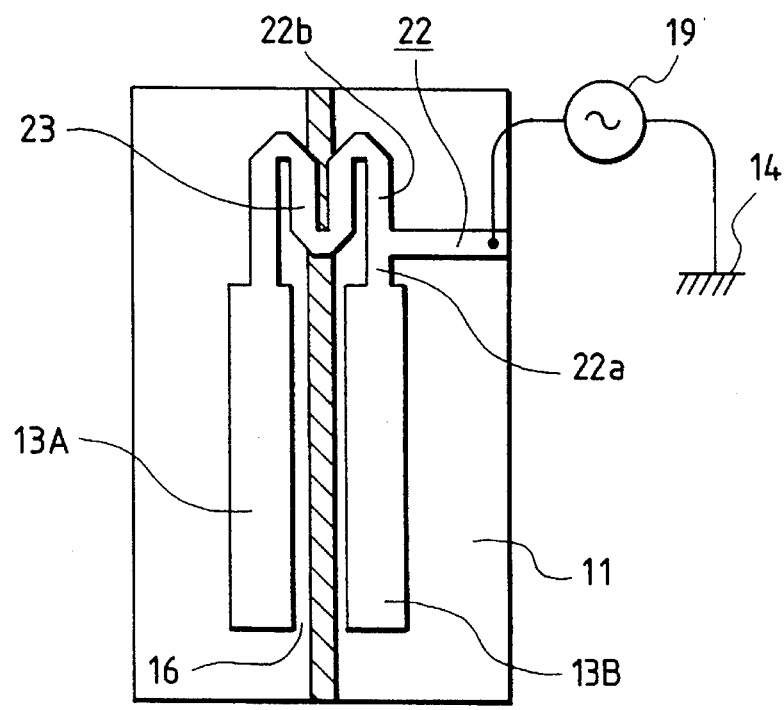
FIG. 6 is a diagram of an optical modulation device according to a third embodiment of this invention.

FIG. 6 shows a third embodiment of this invention which is similar to the embodiment of FIGS. 3 and 4 except for an additional arrangement indicated hereinafter.

As shown in FIG. 6, a signal input terminal 22 is formed on an upper surface of a substrate 11. A signal source 19 for generating a modulating signal is electrically connected between the input terminal 22 and a ground plane 14 formed on a lower surface of the substrate 11. The input terminal 22 has two branches 22a and 22b. The branch 22a is directly connected to an end of a line 13B. The branch 22b is connected to an end of a line 13A via a signal delay element including a signal delay line 23. The delay line 23 is designed to provide a signal phase shift or a signal delay of 180 degrees. Therefore, the modulating signal generated by the signal source 19 is fed via the input terminal 22 to the parallel lines 13A and 13B in a manner such that potentials at corresponding points in the parallel lines 13A and 13B are out of phase by 180 degrees. Thus, a modulating wave in an odd mode is excited along the parallel lines 13A and 13B in response to the modulating signal, and a strong electric field corresponding to the modulating signal is developed in and around a gap 16 between the parallel lines 13A and 13B. The strong electric field enables a high optical modulation efficiency.

It should be noted that a Mach-Zehnder interferometer may be formed on the substrate 11 by using a branch optical waveguide. In this case, an input light beam can be subjected to intensity modulation.

This embodiment may be modified as follows. In a first modification, the substrate 11 is made of material other than LiNbO$_3$ (lithium niobate), and material exhibiting an electro-optical effect and having refractive indices higher than those of the substrate 11 is formed into a film-shaped optical waveguide on the substrate 11. In a second modification, the upper surface of the substrate 11 is formed with an optical-waveguide core portion having refractive indices higher than those of a surround, and an optical-waveguide cladding portion made of electro-optical material is formed on the core portion. In this case, optical modulation is executed by using an electric field of a light beam which extends out of the core portion. In a third modification, ends of the parallel lines 13A and 13B remote from the input terminal 22 are terminated via a resistor or resistors having resistances corresponding to the characteristic impedance of the parallel lines 13A and 13B.

DESCRIPTION OF THE FOURTH PREFERRED EMBODIMENT

Figure 7:
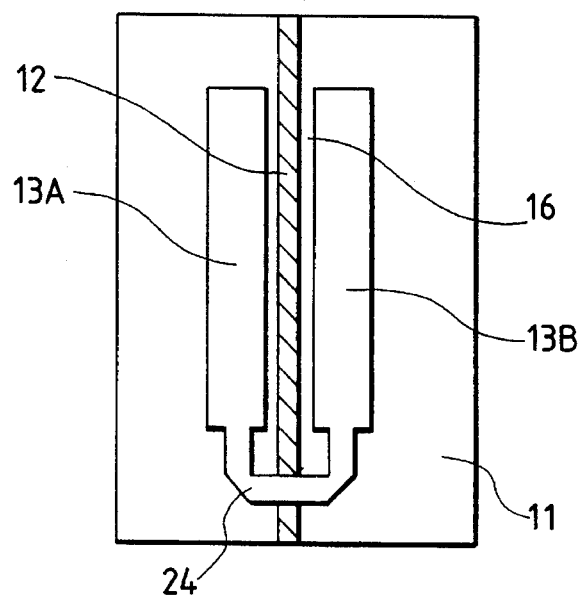
FIG. 7 is a plan view of an optical modulation device according to a fourth embodiment of this invention.

FIG. 7 shows a third embodiment of this invention which is similar to the embodiment of FIGS. 3 and 4 except for an additional arrangement indicated hereinafter.

As shown in FIG. 7, a connection line 24 is formed on an upper surface of a substrate 11. First adjacent ends of parallel lines 13A and 13B are connected to each other via the connection line 24. Second adjacent ends of the parallel lines 13A and 13B are open.

The parallel lines 13A and 13B, and the connection line 24 compose a resonator. The open ends of the parallel lines 13A and 13B reflect a modulating wave so that resonance is performed. In a fundamental resonant state, a modulating wave in an odd mode is excited along the parallel lines 13A and 13B.

Thus, in cases where the resonator is driven in response to a modulating signal by a suitable way, a strong electric field corresponding to the modulating signal is developed in and around a gap 16 between the parallel lines 13A and 13B. The strong electric field enables a high optical modulation efficiency.

It should be noted that a Mach-Zehnder interferometer may be formed on the substrate 11 by using a branch optical waveguide. In this case, an input light beam can be subjected to intensity modulation.

This embodiment may be modified as follows. In a first modification, the substrate 11 is made of material other than LiNbO$_3$ (lithium niobate), and material exhibiting an electro-optical effect and having refractive indices higher than those of the substrate 11 is formed into a film-shaped optical waveguide on the substrate 11. In a second modification, the upper surface of the substrate 11 is formed with an optical-waveguide core portion having refractive indices higher than those of a surround, and an optical-waveguide cladding portion made of electro-optical material is formed on the core portion. In this case, optical modulation is executed by using electric field of a light beam which extends out of the core portion. In a third modification, the parallel lines 13A and 13B are made of superconductor to attain a high Q (quality) factor of the resonator.

DESCRIPTION OF THE FIFTH PREFERRED EMBODIMENT

Figure 8:
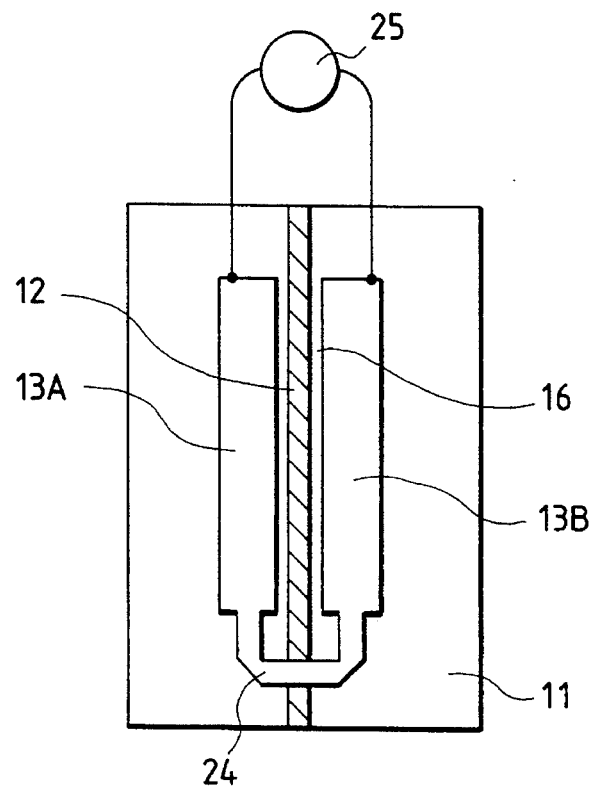
FIG. 8 is a diagram of an optical modulation device according to a fifth embodiment of this invention.

FIG. 8 shows a fifth embodiment of this invention which is similar to the embodiment of FIG. 7 except for an additional arrangement indicated hereinafter.

As shown in FIG. 8, first adjacent ends of parallel lines 13A and 13B are connected to each other via a connection line 24 while second adjacent ends of the parallel lines 13A and 13B are connected to each other via a capacitor 25. When a modulating wave is reflected at the second ends of the parallel lines 13A and 13B, the modulating wave undergoes a phase change. This phase change results in a reduction, of the resonance frequency of a resonator which includes the parallel lines 13A and 13B.

It should be noted that a Mach-Zehnder interferometer may be formed on the substrate 11 by using a branch optical waveguide. In this case, an input light beam can be subjected to intensity modulation.

This embodiment may be modified as follows. In a first modification, the substrate 11 is made of material other than LiNbO$_3$ (lithium niobate), and material exhibiting an electro-optical effect and having refractive indices higher than those of the substrate 11 is formed into a film-shaped optical waveguide on the substrate 11. In a second modification, the upper surface of the substrate 11 is formed with an optical-waveguide core portion having refractive indices higher than those of a surround, and an optical-waveguide cladding portion made of electro-optical material is formed on the core portion. In this case, optical modulation is executed by using an electric field of a light beam which extends out of the core portion. In a third modification, the second ends of the parallel lines 13A and 13B are coupled with each other via a capacitive element other than the capacitor 25, and the capacitive element includes thin films on an upper surface of a substrate 11. In this case, after a single film is formed on the upper surface of the substrate 11, the single film is patterned into the parallel lines 13A and 13B and the capacitive element. In a fourth modification, the capacitor 25 is replaced by a variable capacitance element such as a trimmer capacitor or a varactor diode. In this case, it is possible to adjust the resonance frequency of the resonator. In a fifth modification, the parallel lines 13A and 13B are made of superconductor so that the resonator has a high Q (quality) factor.

DESCRIPTION OF THE SIXTH PREFERRED EMBODIMENT

Figure 9:
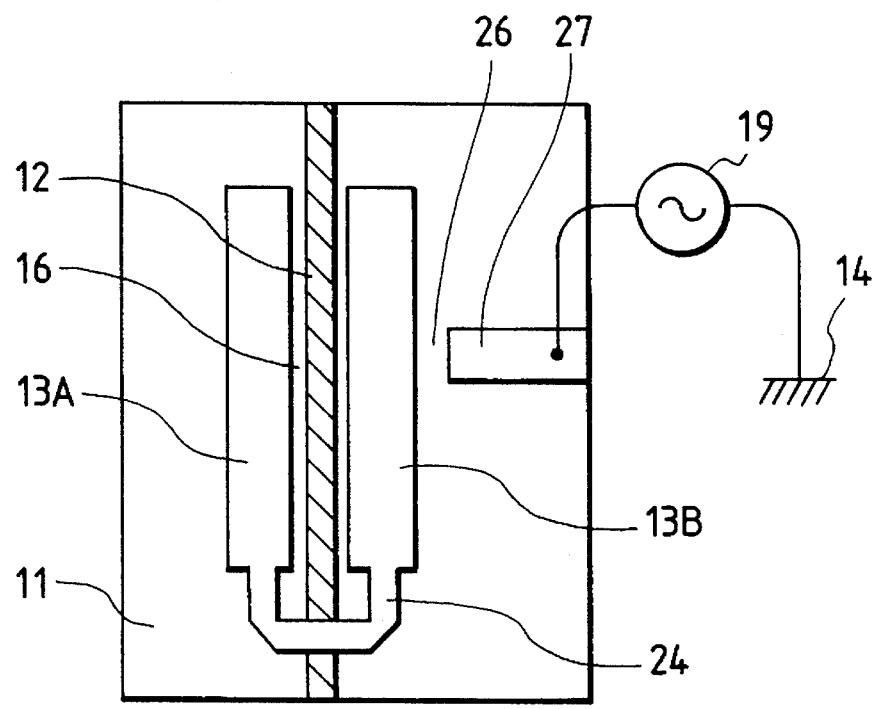
FIG. 9 is a diagram of an optical modulation device according to a sixth embodiment of this invention.

FIG. 9 shows a sixth embodiment of this invention which is similar to the embodiment of FIG. 7 except for an additional arrangement indicated hereinafter.

As shown in FIG. 9, a signal input terminal 27 is formed on an upper surface of a substrate 11. The input terminal 27 is spaced from a side of a line 13B by a gap 26 of a predetermined size. Thus, the input terminal 27 is capacitively coupled with a resonator including parallel lines 13A and 13B. A signal source 19 for generating a modulating signal is electrically connected between the input terminal 27 and a ground plane 14 formed on a lower surface of the substrate 11.

The modulating signal generated by the signal source 19 is fed to the line 13B via the input terminal 27 so that the modulating signal drives the resonator including the parallel lines 13A and 13B. Thus, an input light beam traveling along an optical waveguide 12 is modulated with the modulating signal.

The degree of the coupling between the input terminal 27 and the resonator (the parallel lines 13A and 13B) is chosen so that the resonance operation of the resonator can be optimized. It should be noted that the degree of the coupling between the input terminal 27 and the resonator can be adjusted by varying the size of the gap 26 therebetween or by shifting the place of the coupling to the resonator.

It should be noted that a Mach-Zehnder interferometer may be formed on the substrate 11 by using a branch optical waveguide. In this case, the input light beam can be subjected to intensity modulation.

This embodiment may be modified as follows. In a first modification, the substrate 11 is made of material other than LiNbO$_3$ (lithium niobate), and material exhibiting an electro-optical effect and having refractive indices higher than those of the substrate 11 is formed into a film-shaped optical waveguide on the substrate 11. In a second modification, the upper surface of the substrate 11 is formed with an optical-waveguide core portion having refractive indices higher than those of a surround, and an optical-waveguide cladding portion made of electro-optical material is formed on the core portion. In this case, optical modulation is executed by using an electric field of a light beam which extends out of the core portion. In a third modification, the parallel lines 13A and 13B are made of superconductor so that the resonator has a high Q (quality) factor. In a fourth modification, the input terminal 27 is coupled with a portion of a connection line 24 rather than the line 13B.

DESCRIPTION OF THE SEVENTH PREFERRED EMBODIMENT

Figure 10:
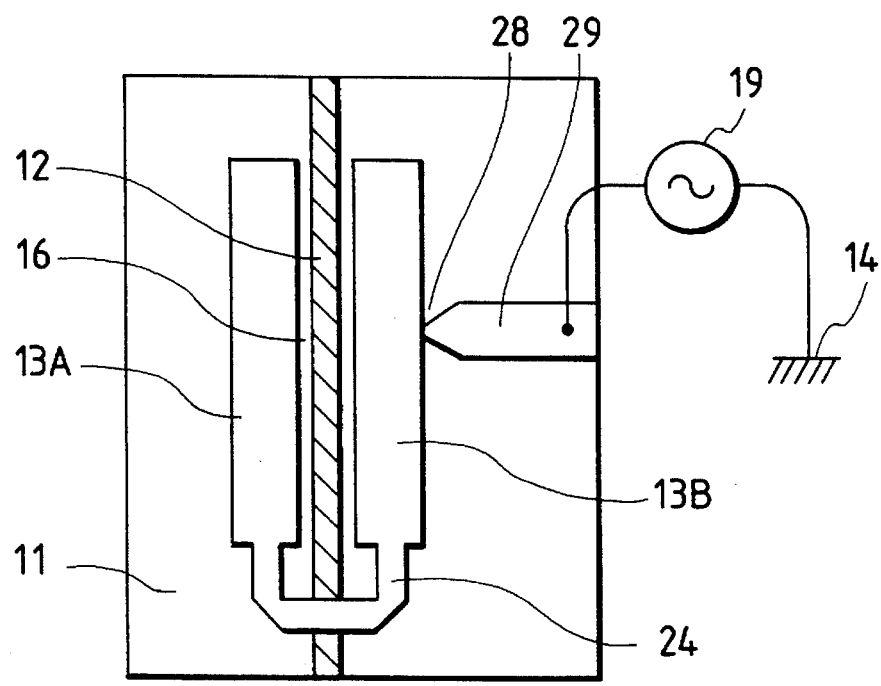
FIG. 10 is a diagram of an optical modulation device according to a seventh embodiment of this invention.

FIG. 10 shows a seventh embodiment of this invention which is similar to the embodiment of FIG. 7 except for an additional arrangement indicated hereinafter.

As shown in FIG. 10, a signal input terminal 29 is formed on an upper surface of a substrate 11. The input terminal 29 is connected to a side of a line 13B via a tap or bridge 28. Thus, the input terminal 29 is inductively coupled with a resonator including parallel lines 13A and 13B. A signal source 19 for generating a modulating signal is electrically connected between the input terminal 29 and a ground plane 14 formed on a lower surface of the substrate 11.

The modulating signal generated by the signal source 210 is fed to the line 13B via the input terminal 29 so that the modulating signal drives the resonator including the parallel lines 13A and 13B. Thus, an input light beam traveling along an optical waveguide 12 is modulated with the modulating signal.

The degree of the coupling between the input terminal 29 and the resonator (the parallel lines 13A and 13B) is chosen so that the resonance operation of the resonator can be optimized. It should be noted that the degree of the coupling between the input terminal 29 and the resonator can be adjusted by shifting the place of the coupling to the resonator.

It should be noted that a Mach-Zehnder interferometer may be formed on the substrate 11 by using a branch optical waveguide. In this case, the input light beam can be subjected to intensity modulation.

This embodiment may be modified as follows. In a first modification, the substrate 11 is made of material other than LiNbO₃ (lithium niobate), and material exhibiting an electro-optical effect and having refractive indices higher than those of the substrate 11 is formed into a film-shaped optical waveguide on the substrate 11. In a second modification, the upper surface of the substrate 11 is formed with an optical-waveguide core portion having refractive indices higher than those of a surround, and an optical-waveguide cladding portion made of electro-optical material is formed on the core portion. In this case, optical modulation is executed by using an electric field of a light beam which extends out of the core portion. In a third modification, the parallel lines 13A and 13B are made of superconductor so that the resonator has a high Q (quality) factor. In a fourth modification, the input terminal 29 is coupled with a portion of a connection line 24 rather than the line 13B.

DESCRIPTION OF THE EIGHTH PREFERRED EMBODIMENT

Figure 11:
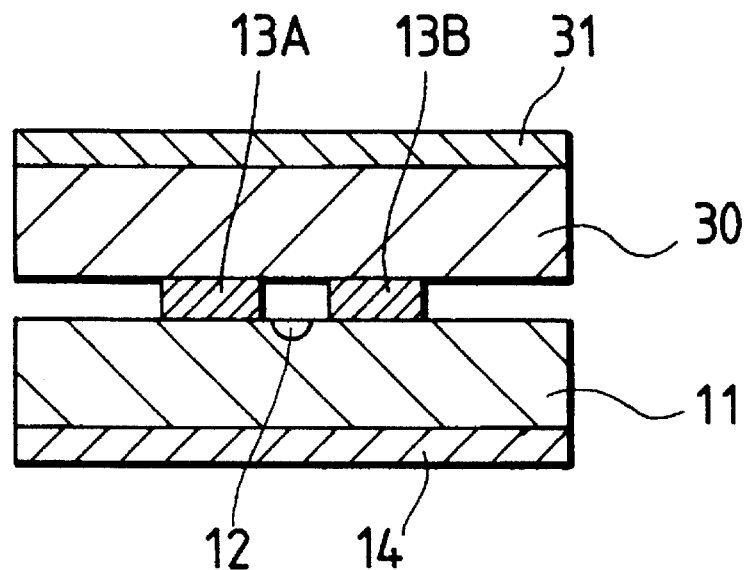
FIG. 11 is a sectional view of an optical modulation device according to an eighth embodiment of this invention.

FIG. 11 shows am eighth embodiment of this invention which is similar to one of the embodiments of FIGS. 3–10 except for an additional arrangement indicated hereinafter.

As shown in FIG. 11, the eighth embodiment has a strip line structure. Specifically, parallel lines 13A and 13B extend between an upper surface of a substrate 11 and a lower surface of a dielectric member 30. A ground plane 31 is formed on an upper surface of the dielectric member 30.

DESCRIPTION OF THE NINTH PREFERRED EMBODIMENT

Figure 12:
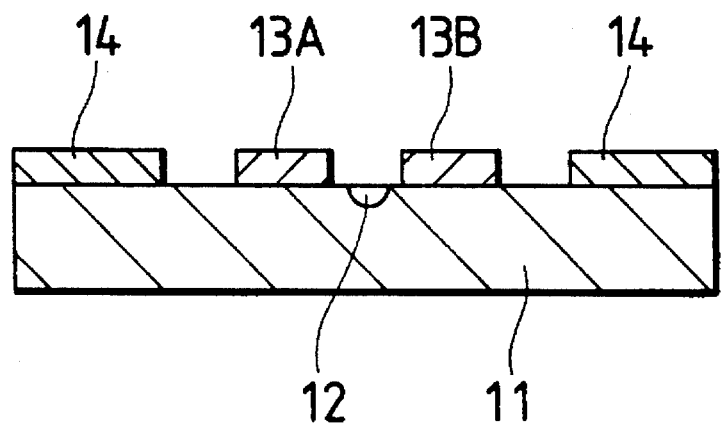
FIG. 12 is a sectional view of an optical modulation device according to a ninth embodiment of this invention.

FIG. 12 shows a ninth embodiment of this invention which is similar to one of the embodiments of FIGS. 3–10 except for design changes indicated hereinafter.

As shown in FIG. 12, the ninth embodiment has a coplanar line structure. Specifically, ground planes 14 are formed on an upper surface of a substrate 11, and parallel lines 13A and 13B extend between the ground planes 14.

DESCRIPTION OF THE TENTH PREFERRED EMBODIMENT

Figure 13:
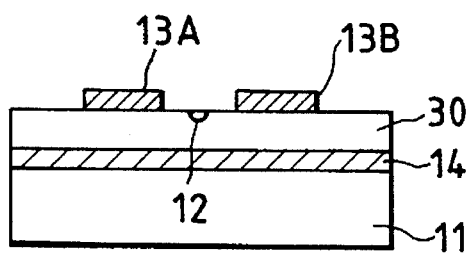
FIG. 13 is a sectional view of an optical modulation device according to a tenth embodiment of this invention.

FIG. 13 shows a tenth embodiment of this invention which is similar to one of the embodiments of FIGS. 3–10 except for design changes indicated hereinafter.

As shown in FIG. 13, the tenth embodiment has a microstrip line structure. A ground plane 14 is sandwiched between an upper surface of a substrate 11 and a lower surface of a dielectric film 30. Parallel lines 13A and 13B extend on an upper surface of the dielectric film 30. An optical waveguide 12 is formed in the upper surface of the dielectric film 30.

The dielectric film 30 in the embodiment of FIG. 13 corresponds to, for example, the substrate 11 in the embodiment of FIG. 4.

DESCRIPTION OF THE ELEVENTH PREFERRED EMBODIMENT

Figure 14:
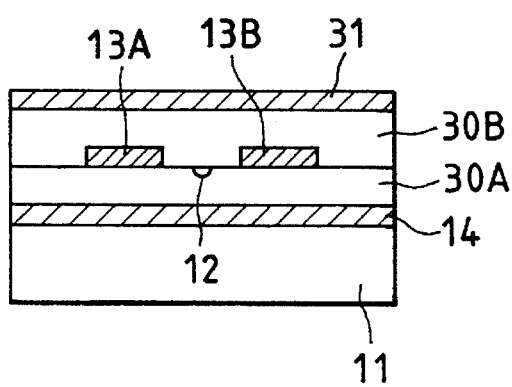
FIG. 14 is a sectional view of an optical modulation device according to an eleventh embodiment of this invention.

FIG. 14 shows an eleventh embodiment of this invention which is similar to one of the embodiments of FIGS. 3–10 except for design changes indicated hereinafter.

As shown in FIG. 14, the eleventh embodiment has a strip line structure. A first ground plane 14 is sandwiched between an upper surface of a substrate 11 and a lower surface of a first dielectric film 30A. Parallel lines 13A and 13B extend on an upper surface of the first dielectric film 30A. An optical waveguide 12 is formed in the upper surface of the first dielectric film 30A.

The upper surface of the first dielectric film 30A, the parallel lines 13A and 13B, and the optical waveguide 12 are coated with a second dielectric film 30B. Thus, the parallel lines 13A and 13B and the optical waveguide 12 are sandwiched between the upper surface of the first dielectric film 30A and the lower surface of the second dielectric film 30B. A second ground plane 31 is formed on an upper surface of the second dielectric film 30B.

DESCRIPTION OF THE TWELFTH PREFERRED EMBODIMENT

Figure 15:
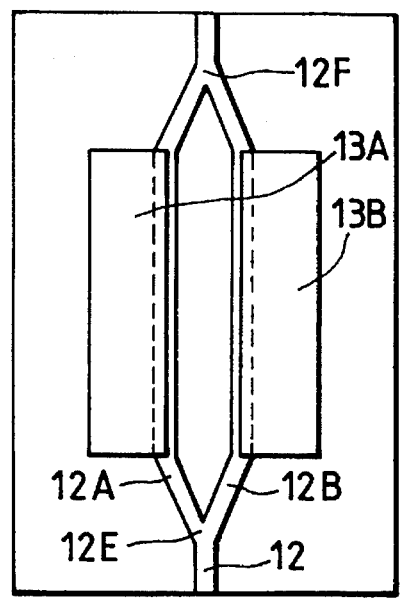
FIG. 15 is a diagram of an optical modulation device according to a twelfth embodiment of this invention.
Figure 16:
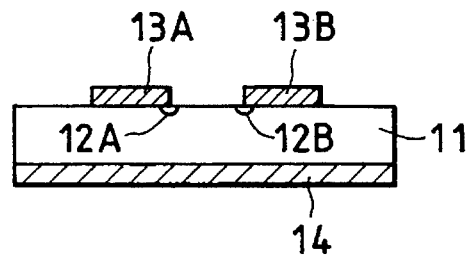
FIG. 16 is a sectional view of the optical modulation device in FIG. 15.

FIGS. 15 and 16 show a twelfth embodiment of this invention which is similar to one of the embodiments of FIGS. 3–10 except for design changes indicated hereinafter.

The embodiment of FIGS. 15 and 16 relates to a Mach-Zehnder interferometer in which an optical waveguide 12 forks into first and second branches 12A and 12B at a point 12E. The first and second branches 12A and 12B have parallel portions spaced by a given distance. The first and second branches 12A and 12B meet at a point 12F distant from the point 12E.

The first branch 12A extends near and along an edge of a first line 13A which is close to a second line 13B, that is, which faces the second line 13B. The second branch 12B extends near and along an edge of the second line 13B which is close to the first line 13A, that is, which faces the first line 13A.

In this embodiment, an input light beam can be subjected to intensity modulation. It should be noted that the illustration of a structure for feeding a signal to the parallel lines 13A and 13B is omitted from FIG. 15 for clarity.

DESCRIPTION OF THE THIRTEENTH PREFERRED EMBODIMENT

Figure 17:
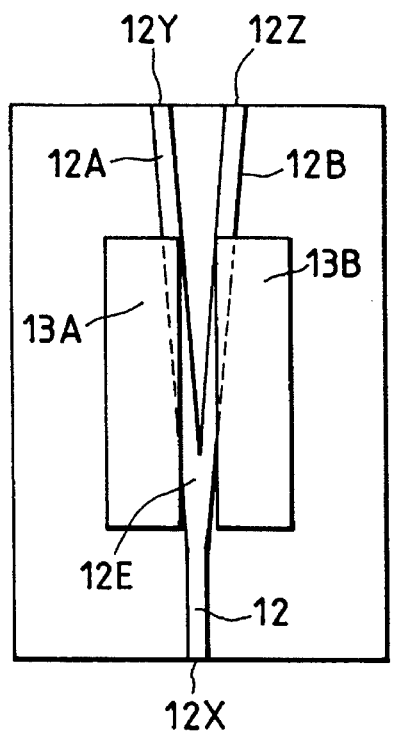
FIG. 17 is a diagram of an optical switch device according to a thirteenth embodiment of this invention.
Figure 18:
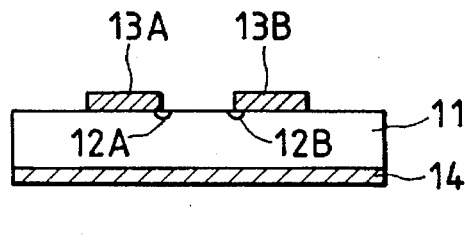
FIG. 18 is a sectional view of the optical switch device in FIG. 17.

FIGS. 17 and 18 show a thirteenth embodiment of this invention which is similar to one of the embodiments of FIGS. 3–10 except for design changes indicated hereinafter.

The embodiment of FIGS. 17 and 18 relates to an optical switch in which an optical waveguide 12 extends from an input port 12X and forks into first and second branches 12A and 12B at a point 12E in a region between parallel lines 13A and 13B. The first and second branches 12A and 12B extend approximately along opposing edges of the parallel lines 13A and 13B, and reach first and second output ports 12Y and 12Z respectively.

There is a structure (not shown in FIGS. 17 and 18) for feeding a signal to the parallel lines 13A and 13B. An electric field is developed between the parallel lines 13A and 13B in response to the fed signal. The branch point 12E is exposed to the electric field developed between the parallel lines 13A and 13B.

An input light beam which has entered the optical waveguide 12 via the input port 12X is selectively conducted to one of the output ports 12Y and 12Z in response to the electric field developed between the parallel lines 13A and 13B, that is, in response to the signal fed to the parallel lines 13A and 13B.

DESCRIPTION OF THE FOURTEENTH PREFERRED EMBODIMENT

Figure 19:
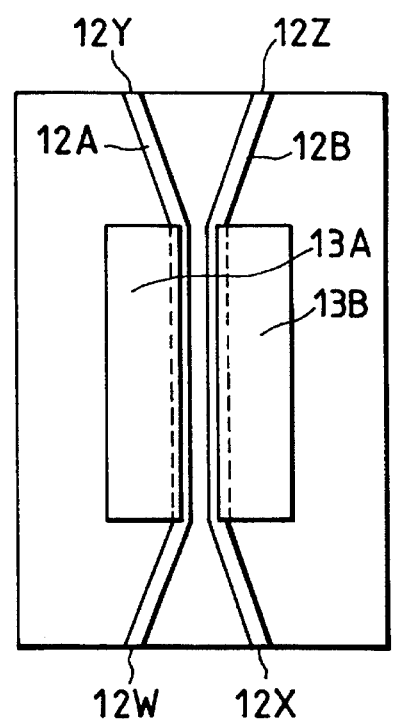
FIG. 19 is a diagram of an optical switch device according to a fourteenth embodiment of this invention.
Figure 20:
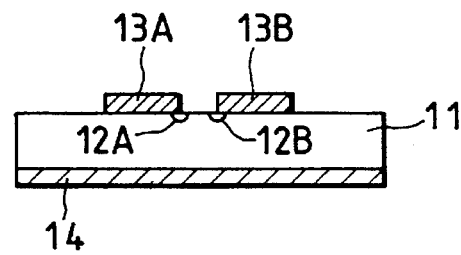
FIG. 20 is a sectional view of the optical switch device in FIG. 19.

FIGS. 19 and 20 show a fourteenth embodiment of this invention which is similar to one of the embodiments of FIGS. 3–10 except for design changes indicated hereinafter.

The embodiment of FIGS. 19 and 20 relates to an optical switch including an optical waveguide directional coupler. As shown in FIGS. 19 and 20, there are two optical waveguides 12A and 12B spatially separate from each other. The optical waveguides 12A and 12B can be optically coupled with each other. The optical waveguides 12A and 12B compose an optical waveguide directional coupler. The first optical waveguide 12A extends between a first input port 12W and a first output port 12Y. The second optical waveguide 12B extends between a second input port 12X and a second output port 12Z.

The first and second optical waveguides 12A and 12B have parallel portions spaced by a given distance. The portion of the first optical waveguide 12A extends near and along an edge of a first line 13A which is close to a second line 13B, that is, which faces the second line 13B. The portion of the second waveguide 12B extends near and along an edge of the second line 13B which is close to the first line 13A, that is, which faces the first line 13A.

There is a structure (not shown in FIGS. 19 and 20) for feeding a signal to the parallel lines 13A and 13B. An electric field is developed between the parallel lines 13A and 13B in response to the fed signal. The degree of coupling between the first and second optical waveguides 12A and 12B depends on the electric field developed between the parallel lines 13A and 13B.

An input light beam which has entered the first optical waveguide 12A via the input port 12W is divided into two beams at a ratio depending on the electric field developed between the parallel lines 13A and 13B, that is, depending on the signal fed to the parallel lines 13A and 13B. The two beams are guided to the first and second output ports 12Y and 12Z respectively.

An input light beam which has entered the second optical waveguide 12B via the input port 12X is divided into two beams at a ratio depending on the electric field developed between the parallel lines 13A and 13B, that is, depending on the signal fed to the parallel lines 13A and 13B. The two beams are guided to the first and second output ports 12Y and 12Z respectively.

DESCRIPTION OF THE FIFTEENTH PREFERRED EMBODIMENT

Figure 21:
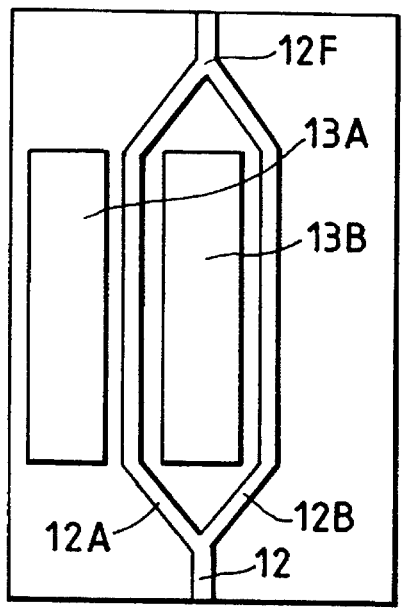
FIG. 21 is a diagram of an optical modulation device according to a fifteenth embodiment of this invention.
Figure 22:
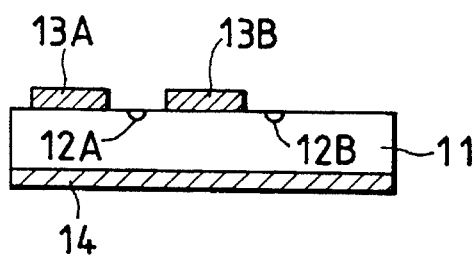
FIG. 22 is a sectional view of the optical modulation device in FIG. 21.

FIGS. 21 and 22 show a fifteenth embodiment of this invention which is similar to one of the embodiments of FIGS. 3–10 except for design changes indicated hereinafter.

The embodiment of FIGS. 21 and 22 relates to a Mach-Zehnder interferometer in which an optical waveguide 12 forks into first and second branches 12A and 12B at a point 12E. The first and second branches 12A and 12B have parallel portions spaced by a given distance. The first and second branches 12A and 12B meet at a point 12F distant from the point 12E.

The first branch 12A extends through a region between parallel lines 13A and 13B. A major portion of the first branch 12A is parallel to the parallel lines 13A and 13B. The second branch 12 extends along a side of the second line 13B which is remote from the first line 13A. Thus, the second line 13B lies between the first branch 12A and the second branch 12B. A major portion of the second branch 12B is parallel to the second line 13B, and is spaced therefrom by a given distance.

An input light beam which has entered the optical waveguide 12 is divided into two beams at the point 12E. The two beams travel along the first and second branches 12A and 12B before combining into a composite beam at the point 12F.

There is a structure (not shown in FIGS. 21 and 22) for feeding a signal to the parallel lines 13A and 13B. An electric field is developed between the parallel lines 13A and 13B in response to the fed signal. The light beam traveling along the branch 12A undergoes phase modulation responsive to the electric field developed between the parallel lines 13A and 13B, that is, responsive to the signal fed to the parallel lines 13A and 13B. On the other hand, the light beam traveling along the branch 12B is independent of the electric field developed between the parallel lines 13A and 13B. The light beam which has traveled along the branch 12A and the light beam which has traveled along the branch 12B combine into a composite beam at the point 12F while interfering with each other. The interference causes the composite light beam to be equivalent to a resultant of intensity modulation of the input light beam in response to the electric field developed between the parallel lines 13A and 13B, that is, in response to the signal fed to the parallel lines 13A and 13B.

DESCRIPTION OF THE SIXTEENTH PREFERRED EMBODIMENT

Figure 23:
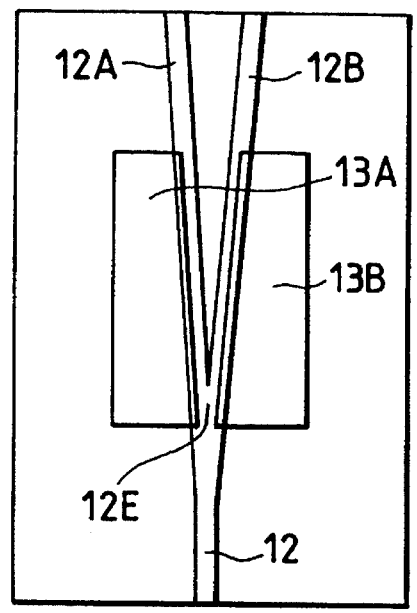
FIG. 23 is a diagram of an optical switch device according to a sixteenth embodiment of this invention.
Figure 24:
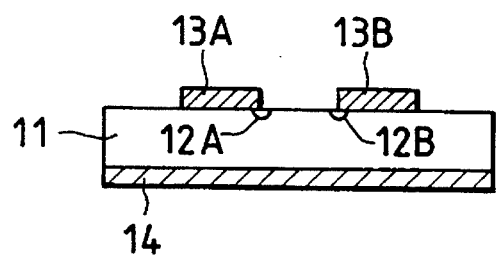
FIG. 24 is a sectional view of the optical switch device in FIG. 23.

FIGS. 23 and 24 show a sixteenth embodiment of this invention which is similar to the embodiment of FIGS. 17 and 18 except for design changes indicated hereinafter.

In the embodiment of FIGS. 23 and 24, opposing (adjacent) edges of parallel lines 13A and 13B are inclined with respect to each other according to an angle formed by first and second optical waveguide branches 12A and 12B.

The first branch 12A extends near and along the edge of the first line 13A which is close to the second line 13B, that is, which faces the second line 13B. The second branch 12B extends near and along the edge of the second line 13B which is close to the first line 13A, that is, which faces the first line 13A.

What is claimed is:

1. An optical modulation device comprising:

a substrate;

a dielectric member having first and second surfaces opposite to each other;

an optical waveguide extending on the first surface of the dielectric member and exhibiting an electro-optical effect;

first and second parallel lines electromagnetically coupled with each other and being of a microstrip line structure;

wherein the first line comprises a first line member and a ground plane, and the second line comprises a second line member and the ground plane, wherein the first line member and the second line member extend on the first surface of the dielectric member and extend at opposite sides of the optical waveguide respectively, and wherein the ground plane extends between the substrate and the second surface of the dielectric member.

2. An optical modulation device comprising:

a substrate;

a first dielectric member having first and second surfaces opposite to each other;

a second dielectric member having first and second surfaces opposite to each other;

an optical waveguide extending between the first surface of the first dielectric member and the second surface of the second dielectric member and exhibiting an electro-optical effect;

first and second parallel lines electromagnetically coupled with each other and being of a strip line structure;

wherein the first line comprises a first line member and first and second ground planes, and the second line comprises a second line member and the first and second ground planes, wherein the first line member and the second line member extend between the first surface of the first dielectric member and the second surface of the second dielectric member and extend at opposite sides of the optical waveguide respectively, wherein the first ground plane extends between the substrate and the second surface of the first dielectric member, and wherein the second ground plane is located on the first surface of the second dielectric member.

3. An optical modulation device comprising:

a substrate having first and second surfaces opposite, to each other;

an optical waveguide extending on the first surface of the substrate and exhibiting an electro-optical effect, the optical waveguide dividing into first and second branches at a first point, the first and second branches extending on the first surface of the substrate and meeting at a second point different from the first point;

first and second parallel lines electromagnetically coupled with each other and being of a microstrip line structure;

wherein the first line comprises a first line member and a ground plane, and the second line comprises a second line member and the ground plane, wherein the first line member and the second line member extend on the first surface of the substrate, wherein the first branch extends near and along an edge of the first line member which faces the second line member, wherein the second branch extends near and along an edge of the second line member which faces the first line member, and wherein the ground plane is located on the second surface of the substrate.

4. An optical switch device comprising:

a substrate having first and second surfaces opposite to each other;

an optical waveguide extending on the first surface of the substrate and exhibiting an electro-optical effect, the optical waveguide dividing into first and second branches at a division point, the first and second branches extending on the first surface of the substrate;

first and second parallel lines electromagnetically coupled with each other and being of a microstrip line structure;

wherein the first line comprises a first line member and a ground plane, and the second line comprises a second line member and the ground plane, wherein the first line member and the second line member extend on the first surface of the substrate, wherein the division point is located in a region between the first line member and the second line member, and wherein the ground plane is located on the second surface of the substrate.

5. The optical switch device of claim 4, wherein opposing edges of the first and second line members incline with respect to each other, wherein the first branch extends near and along the inclining edge of the first line member, and wherein the second branch extends near and along the inclining edge of the second line member.

6. An optical switch device comprising:

a substrate having first and second surfaces opposite to each other;

a first optical waveguide extending on the first surface of the substrate and exhibiting an electro-optical effect;

a second optical waveguide extending on the first surface of the substrate and exhibiting an electro-optical effect, wherein the first and second optical waveguides are optically coupled with each other; and first and second parallel lines electromagnetically coupled with each other and being of a microstrip line structure;

wherein the first line comprises a first line member and a ground plane, and the second line comprises a second line member and the ground plane, wherein the first line member and the second line member extend on the first surface of the substrate, wherein the first optical waveguide extends near and along an edge of the first line member which faces the second line member, wherein the second optical waveguide extends near and along an edge of the second line member which faces the first line member, and wherein the ground plane is located on the second surface of the substrate.

7. An optical modulation device comprising:

a substrate having first and second surfaces opposite to each other;

an optical waveguide extending on the first surface of the substrate and exhibiting an electro-optical effect, the optical waveguide dividing into first and second branches at a first point, the first and second branches extending on the first surface of the substrate and meeting at a second point different from the first point;

first and second parallel lines electromagnetically coupled with each other and being of a microstrip line structure;

wherein the first line comprises a first line member and a ground plane, and the second line comprises a second line member and the ground plane, wherein the first line member and the second line member extend on the first surface of the substrate, wherein the first branch extends through a region between the first line member and the second line member, wherein the second branch extends at a side of the second line member which is remote from the first line member, wherein the second line member is located between the first branch and the second branch, and wherein the ground plane is located on the second surface of the substrate.

* * * * *

UNITED STATES PATENT AND TRADEMARK OFFICE
CERTIFICATE OF CORRECTION

PATENT NO. : 5,530,777

DATED : June 25, 1996

INVENTOR(S) : Akira Enokihara, et al.

It is certified that error appears in the above-identified patent and that said Letters Patent is hereby corrected as shown below:

On the Title page, item [73] should be changed to read --MATSUSHITA ELECTRIC INDUSTRIAL CO., LTD.--

Signed and Sealed this

First Day of April, 1997

Attest:

BRUCE LEHMAN

Attesting Officer

Commissioner of Patents and Trademarks